United States Patent
Myers et al.

(10) Patent No.: US 9,809,146 B2
(45) Date of Patent: Nov. 7, 2017

(54) GENERIC RACK TRANSPORTATION TOP CAP

(71) Applicant: Dell Products L.P., Round Rock, TX (US)

(72) Inventors: Dusty Myers, Round Rock, TX (US); Steven Embleton, Austin, TX (US); James Don Curlee, Round Rock, TX (US); Charles Money, SAustin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/942,330

(22) Filed: Nov. 16, 2015

(65) Prior Publication Data

US 2017/0136937 A1    May 18, 2017

(51) Int. Cl.
*B60P 7/08* (2006.01)
*B60P 7/10* (2006.01)
*B60P 7/18* (2006.01)

(52) U.S. Cl.
CPC .. *B60P 7/10* (2013.01); *B60P 7/18* (2013.01)

(58) Field of Classification Search
CPC ..................... B60P 7/10; B60P 7/18
USPC ...... 410/32, 34, 35, 38, 41, 46, 97, 99, 100, 410/120, 155; 206/597; 108/55.1, 57.2
See application file for complete search history.

(56) References Cited

U.S. PATENT DOCUMENTS

| | | | | | |
|---|---|---|---|---|---|
| 3,387,813 | A | * | 6/1968 | Carino | B60P 7/12 410/50 |
| 3,478,995 | A | * | 11/1969 | Lautzenhiser | B61D 45/001 410/104 |
| 5,297,485 | A | * | 3/1994 | Bond | B65D 19/44 108/55.1 |
| 6,276,285 | B1 | * | 8/2001 | Ruch | B65D 19/44 108/55.5 |
| 7,311,484 | B2 | * | 12/2007 | Facey | B60P 7/083 410/100 |
| 7,377,393 | B2 | * | 5/2008 | Maresh | B60P 7/065 410/119 |
| 7,798,754 | B2 | * | 9/2010 | Funk | B60P 7/065 410/155 |
| 8,418,632 | B2 | * | 4/2013 | Linares | |

* cited by examiner

*Primary Examiner* — Stephen Gordon (74) *Attorney, Agent, or Firm* — Baker Botts L.L.P.

(57) ABSTRACT

A top cap for securing items during shipping is disclosed. The top cap consists of a body having one or more features configured to engage the top of the item being shipped. In certain embodiments, the engagements features are adjustable and may accommodate different sizes of items to be shipped. The body also comprises one or more constraint securement features configured to receive constraints such that the top cap may be secured to structural elements of a container in which the item is being shipped. Although not limited to particular applications, the top cap is particularly suited for securing computer racks for shipment.

20 Claims, 11 Drawing Sheets

GENERIC RACK TRANSPORTATION TOP CAP

TECHNICAL FIELD

This disclosure generally relates to a device and method for securing items for transportation, and in particular, to securing computer racks for transportation.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information.

Information handling systems may take the form of rack-mounted components occupying one of more slots of a computer rack. Components contained in a rack may include servers, switches, firewalls, network appliances, and other types of computer hardware. A rack may also include features and components for power management, cooling, cable management, and other related utility functions.

Racks are routinely shipped worldwide between rack manufacturers, data centers, and similar destinations. Because of the variability of rack contents, racks may vary significantly in weight, footprint, height, and other physical characteristics. As a result, ensuring racks are properly secured for transportation can present a significant challenge to rack manufacturers, logistics companies, and others who may be required to prepare racks for transportation.

Failure to properly secure a rack may result in significant damage to the rack and its components. For example, improperly secured racks may be subject to impact events leading to bending or other damage to the rack frame or to excessive vibrations which may lead to seizing of casters used to move the rack. Such damage lead to a wide range of problems from delayed delivery of the rack to complete scrapping of the rack hardware and may leave rack manufacturers facing decreased customer satisfaction and increased costs due to repairing or replacing damaged rack equipment. Moreover, improperly secured racks present a safety hazard for personnel involved in packaging, transporting, and unpackaging.

Typically, shock pallets and crates are used for securing racks for transportation. Generally, these must be custom designed and built to meet the requirements of racks being shipped. As a result, shock pallets and crates may be expensive to design and build and vary in appearance and construction. Moreover, because the size and design of shock pallets or crates may vary from rack to rack, the methods of strapping or otherwise securing a shock pallet or crate for transportation may also vary from rack to rack, leading to improper and inconsistent strapping.

In light of the above, the present disclosure provides systems and methods for constraining a rack while eliminating strapping inconsistencies, decreasing unpackaging time, and significantly reducing packaging costs is desirable.

SUMMARY

In one embodiment, a device for securing an item for shipping comprises a body, engagement features for engaging structural elements of the item to be shipped, and one or more constraint securement features configured to receive constraints to secure the top cap to a structural feature of a container. Examples of suitable constraints include, but are not limited to, straps, ropes, cables, cords, chains, netting, and solid bars.

In certain embodiments, the engagement features may be movable between different positions on the body, permitting the top cap to be used for items of different sizes. For example the engagement features may be brackets disposed in slots defied by the body and the brackets may be selectively positionable within the slots. As another example, the body may define various holes in which the brackets may be installed to accommodate different sizes of items.

In certain embodiments, the body may also include one or more mating features configured to directly attach the top cap to at least one of a structural feature of the container or a second top cap.

In other embodiments, the constraint securement features of the body comprise at least one of least one of an eyebolt, a slot defined by the body, a clip, a hoop, a tie-down anchor, and a pulley.

In another embodiment, a method of securing an item to be transported is disclosed. The method comprises placing a top cap according to this disclosure atop an item to be shipped, engaging the one or more engagement features with structural elements of the item to be shipped, attaching constraints to the top cap, and securing the top cap with the constraints to a structural feature of a container.

In certain embodiments, engaging the one or more engagement features of the top cap may comprise adjusting the position of a bracket along a slot defined by the top cap's body.

In certain embodiments, the method may further comprise engaging a mating feature of the top cap with one or more of a second structural feature of the container and a mating feature of a second top cap.

In other embodiments, the method may further comprise removing the top cap from the item, adjusting the engagement features to accommodate a second item, engaging the engagement features with structural elements of the second item, attaching constraints to the top cap and securing the top cap to structural features via the constraints.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DESCRIPTION

This disclosure generally relates to shipping and transportation of items and, in particular, to shipping and transportation of computer racks. A top cap is disclosed that is secured to the top of a rack to be shipped. The top cap is then secured to structural features of a container using straps or similar constraints, eliminating the need for a complete shell or crate. Moreover, because the top cap is placed on and secured on top of the rack, the top cap helps to reduce swaying during transportation and is therefore particularly advantageous for shipping tall racks.

The top can includes a body having one or more engagement features positioned to engage structural elements of the computer rack. For example, the engagement features may be positioned to abut the frame of the rack. In certain embodiments, the engagement features may also be repositionable or otherwise adjustable to accommodate different sizes and shapes of computer racks.

As compared to previous shipping methods, such as shock pallets or crates, the top cap requires less material. As a result, material costs and weight are reduced. This impacts not only initial fabrication costs but also costs associated with transporting the extra weight attributable to shipping materials. In certain embodiments, the top cap may also be designed to be reused for shipping other racks. If a given top cap includes adjustable engagement features, it may even be reused to secure racks of differing dimensions.

The top cap includes constraint securement features for receiving straps, ropes, cables, or other constraints for securing the top cap and rack. In certain embodiments, the top cap is designed to interface with common shipping devices, such as ratcheting straps, and/or tie-down systems such as E-Track or L-Track. As the top cap is adjusted to accommodate changes in rack dimensions, the position of the constraint securement features remains constant. As a result, the manner in which the constraints secure the top cap remains consistent regardless of changes in the size of the rack to be transported, reducing the likelihood that constraints will be improperly installed and that the top cap will be improperly secured.

The constraints may be used to secure the top cap and rack to structural members within a container, such as a cargo container. For example, the top cap may be secured to structural members such as E-Track, L-Track, tactical or cargo bars, a wall, or other structural features of the container. For purposes of this disclosure, a cargo container may be any container for transporting cargo regardless of the type of transportation vehicle. Examples of containers include, but are not limited to, semi-trailers, shipping containers, train cars, aircraft cargo holds, and flatbeds.

The present disclosure is now described in detail with reference to one or more embodiments thereof as illustrated in the accompanying drawings. In the following description, numerous specific details are set forth in order to provide a thorough understanding of the present disclosure. However, the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

For example, although the present disclosure primarily discusses transportation of computer racks, one or more embodiments disclosed may be modified to be suitable for secure transportation of other items.

Figure 1:
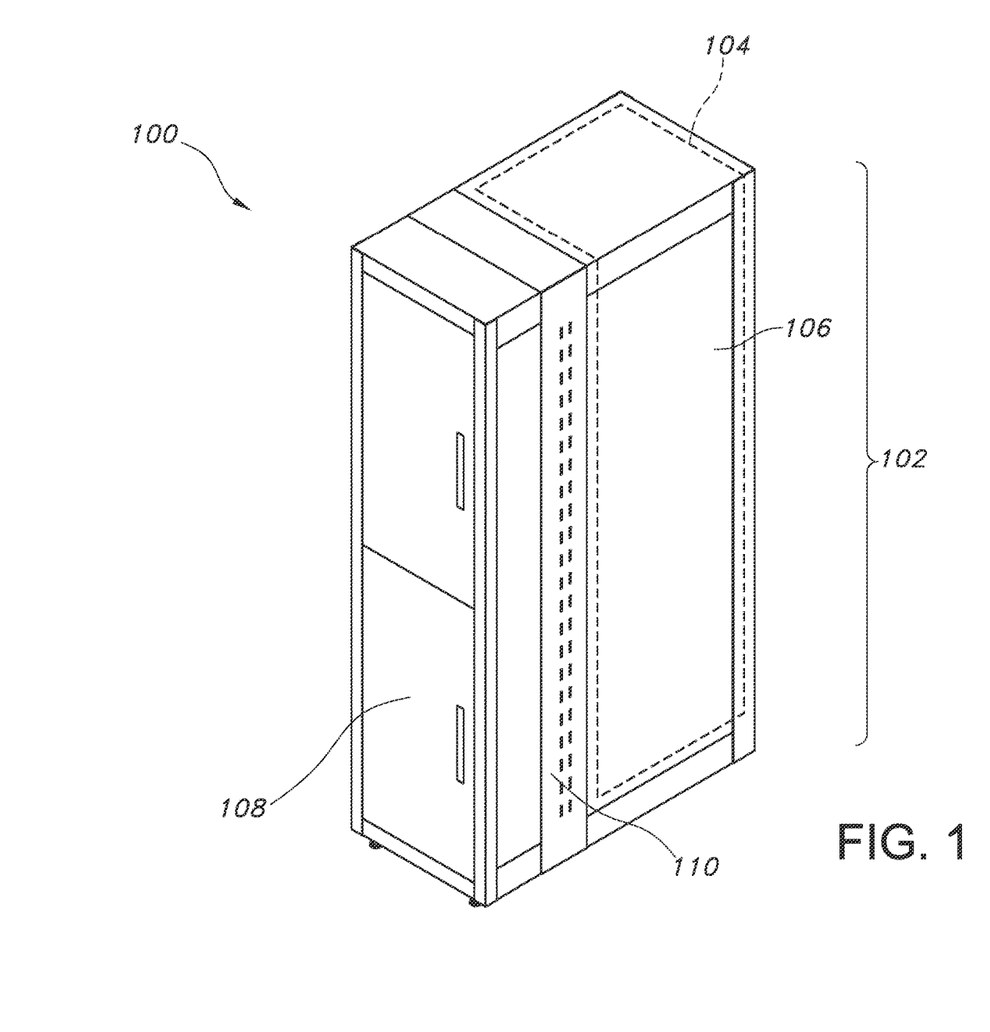
FIG. 1 is an isometric view of a generic computer rack.

FIG. 1 illustrates an example of a computer rack 100. A rack is generally a container for housing one or more information systems and related components. These components may include servers, switches, appliances, firewalls, and various other pieces of computing and networking hardware. Rack 100 generally comprises a main rack section 102 further comprising an internal frame 104 or similar structure encased in a rigid shell 106. Rack 100 may also include one or more doors 108 to permit access to the components contained in rack 100. Rack 100 may also include a cable management bracket 110 for retaining and routing cabling associated with rack components. Cable management brackets, such as cable management 110, typically extend from the main rack section 102, but are not reinforced by a frame similar to frame 104 of main rack section 102. Because of this lack of support, cable management brackets are particularly prone to damage during transportation. In any one or more embodiments, rack 100 may comprise any one or more components shown in FIG. 1 or any other one or more components known to one of ordinary skill in the art.

Figure 2A:
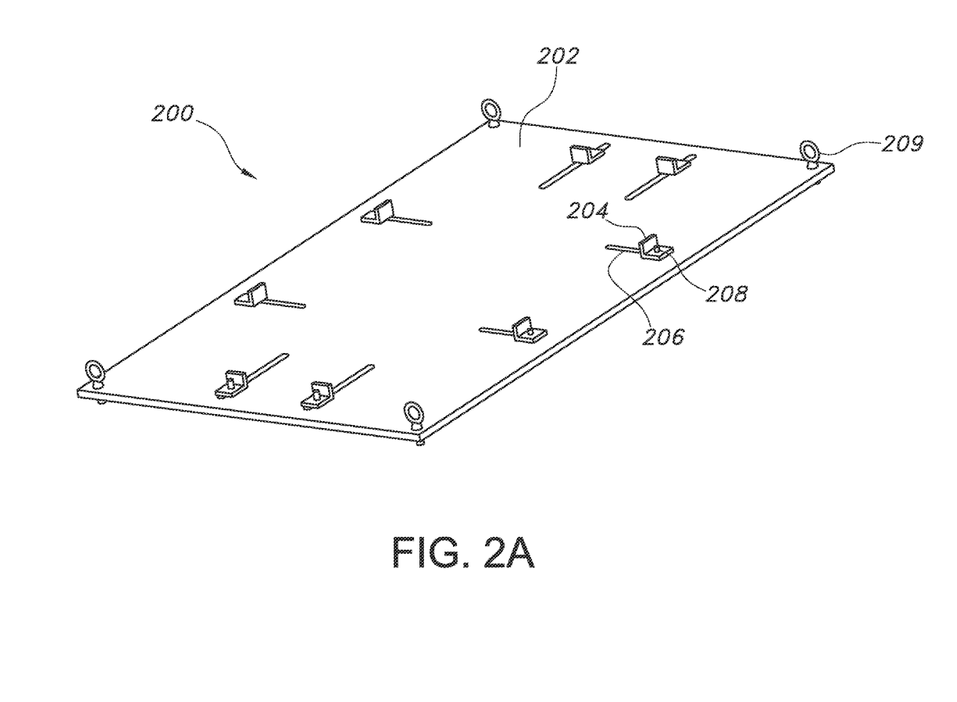
FIG. 2A is an isometric view of a top cap in accordance with a first embodiment of this disclosure.

FIG. 2A depicts an upside-down isometric view of a top cap 200 according to one embodiment of the present disclosure. Top cap 200 comprises a body 202. In one embodiment, body 202 may be formed of a rigid material. The rigid material may be, but is not limited to, plastic, wood, and metal. Recyclable or biodegradable materials may also be used to minimize waste associated with manufacturing and disposal. In another embodiment, body 202 may be formed of a rigid material, a semi-rigid material, a pliable material, any suitable material known to one of ordinary skill in the art, or any combination thereof.

Top cap 200 includes one or more rack engagement features for fitting the top cap 200 to the top of a rack 100 to be shipped. In the embodiment of FIG. 2A, the rack engagement features are movable brackets 204. Each movable bracket 204 is positioned within a respective slot 206 in the body 202. Moveable brackets 204 may be secured in place by fasteners 208. During use, each of the movable brackets 204 is positioned and secured along its respective slot 206 to fit the dimensions of the rack 100. In one embodiment, one or more of the movable brackets 204 may be positioned to engage the top of the rack 100. For example, when the top cap 200 is placed on top of or atop the rack 100, the movable brackets 204 engage the top of the rack 100. The top of the rack 100 may be any side of rack 100. If the dimensions of the rack 100 are known ahead of time, the moveable brackets 204 may be positioned in the proper location prior to placing the top cap 200 on the rack 100.

Alternatively, the top cap 200 may first be placed on the rack 100 with the moveable brackets 204 removed or otherwise displaced from the rack 100. Once the top cap 200 is in position, any one or more of the moveable brackets 204 may be reinstalled or repositioned along each respective slot to fit the size of the rack 100. In certain embodiments, the rack engagement features may engage the rack by fitting to the overall dimensions of rigid shell 106. In certain embodiments, rigid shell 106 may include slots or other features to mate with rack engagement features.

Figure 2B:
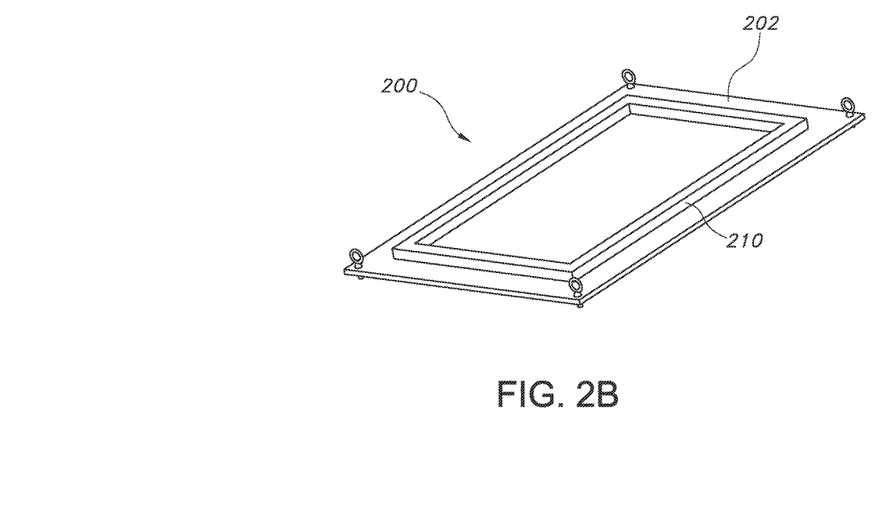
FIG. 2B is an isometric view of a top cap in accordance with a second embodiment of this disclosure.
Figure 2C:
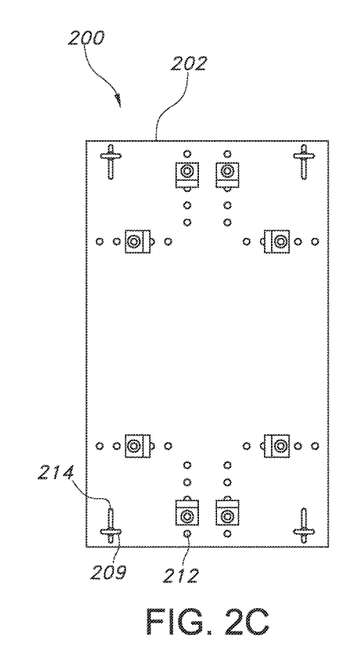
FIG. 2C is a view of the underside of a top cap in accordance with a third embodiment of this disclosure.

Any one or more types of rack engagement features may also be used in place of or in combination with moveable brackets 204. In some embodiments, one or more rack engagement features may be integrally formed with the body 202. For example, in the embodiment of top cap 200 depicted in FIG. 2B, the body 202 includes integral protrusions 210 shaped to engage the top of the rack 100. The body 202 may also include recesses shaped to engage the top of the rack 100. Rack engagement features may also be fixedly installed on the body 202. For example, in the embodiment of top cap 200 depicted in FIG. 2C, the body 202 includes sets of holes 212 to permit installation of brackets 204 or other rack engagement features around the body 202.

Embodiments in accordance with this disclosure are not limited to particular numbers or arrangements of rack engagement features. For example, the number of rack engagement features may vary depending on, among other things, the size of the rack 100 to be shipped, the amount of contact surface between the rack engagement features and the rack 100, and the location of the rack engagement features. By way of example, top cap 200 of FIG. 2A includes eight moveable brackets 204 arranged two per side of the body 202. Other embodiments may include more or fewer moveable brackets 204. Moreover, the moveable brackets 204 may be arranged at locations other than along the sides of the body 202. For example, instead of or in addition to slots 206 extending perpendicularly from the edge of the body 202, slots 206 may extend inward from corners of the body 202 such that movable brackets 204 positioned within the corner slots may engage corners of the rack 100.

In one or more embodiments, a top cap 200 may also include constraint securement features for receiving constraints. In FIG. 2A, for example, the constraint securement features are a set of eyebolts, such as eye bolt 209, positioned at each corner of the body 202. After top cap 200 is placed on top of and fit to the rack 100 to be shipped, constraints may be attached to or passed through the eye bolts 210 and used to tie-down or otherwise secure the top cap 200 to structural elements of a container. Constraint securement features are not limited to the eyebolts 210 depicted in FIG. 2A and may include slots, clips, hoops, tie-down anchors, pulleys, any other suitable feature for receiving a constraint known to one of ordinary skill in the art, or any combination thereof. The constraint securement features may be integrally formed with the body 202, moveable between multiple positions on the body 202, or selectively detachable from the body 202. For example, in some embodiments, constraint securement features may be constraint securement slots integrally formed around the periphery of the body 202 of top cap 200. In other embodiments, non-integrally formed constraint securement features, such as eyebolts 210, may be movable along slots formed in the body or between holes positioned around the body. For example, in FIG. 2C, eyebolt 209 may be positioned along a slot 214. The particular constraints used to secure the top cap 200 to structural elements of the container may vary depending on, for example, the type of constraint securement features used by the top cap 200, and the type of structural elements in the container to which the top cap 200 is secured. Suitable constraints may include but are not limited to straps, ropes, cables, cords, chains, netting, and solid bars.

Figure 3:
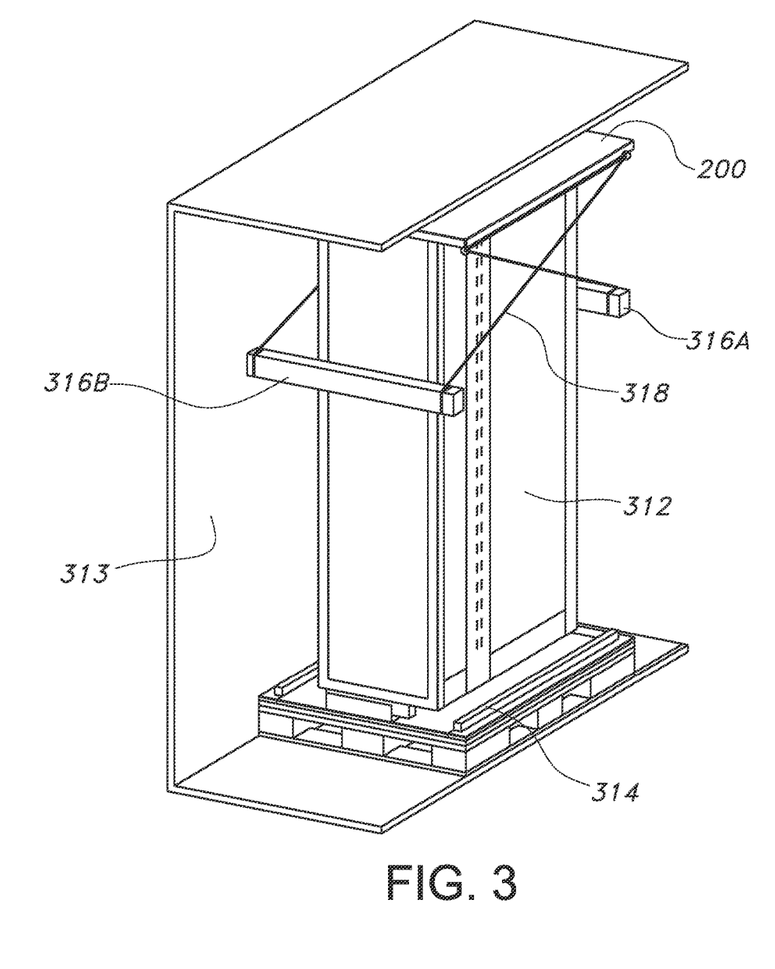
FIG. 3 is an internal isometric view of a container having a computer rack secured with a top cap in accordance with an embodiment of this disclosure.
Figure 7:
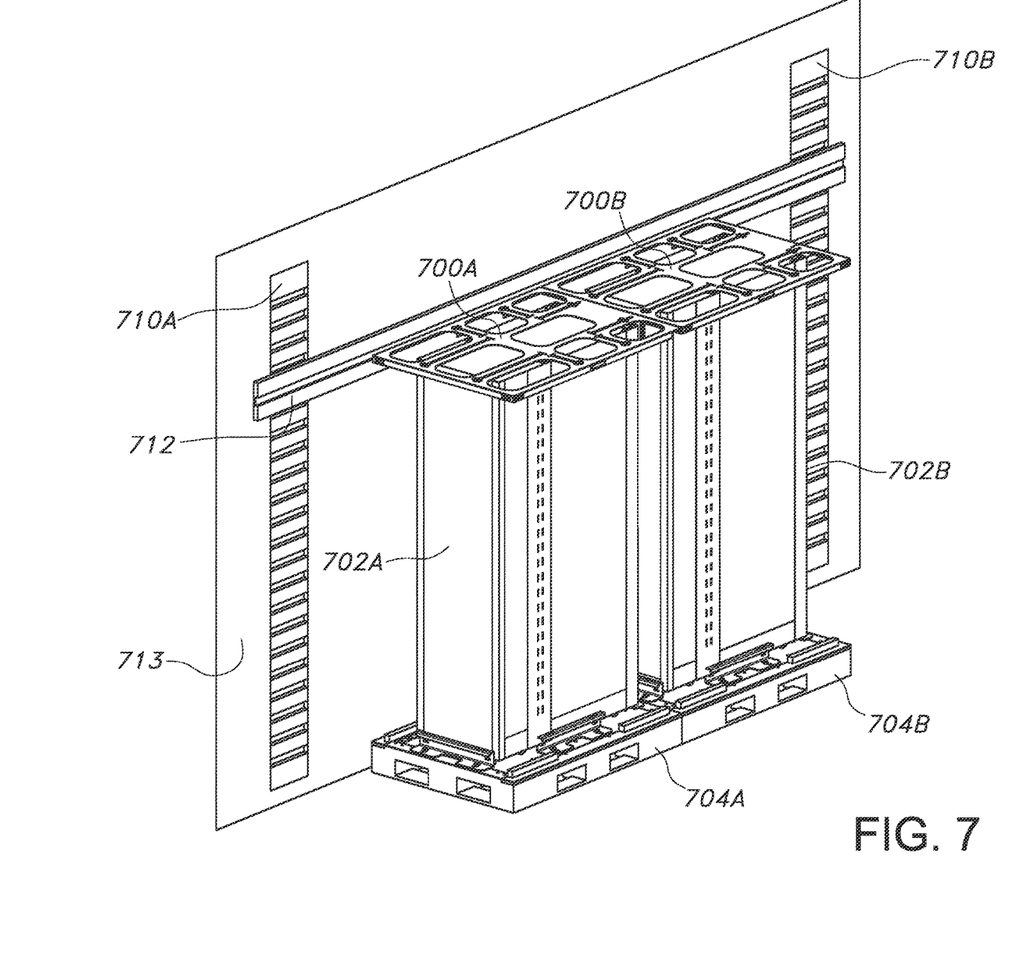
FIG. 7 is an isometric view of two computer racks in a close packed configuration with top caps attached to a structural feature of a container.

FIG. 3 is an isometric view of a rack 312 secured using top cap 200 within a container 313. Rack 312 may be placed on a pallet 314 or similar platform for transportation. Container 313 may include structural features configured to receive constraints for securing top cap 200. In the embodiment of FIG. 3, container 313 includes load bars 316A, 316B that extend across container 313. Constraints 318 may be tied or otherwise attached to load bars 316A, 316B to secure top cap 200. Other types of structural features may also be used to secure top cap 200. For example, tie down systems, such as E-Track or L-Track, may be installed in the walls or floor of the container 313, and the top cap 200 may be secured to the tie down system using suitable constraints. The top cap 200 may be similarly secured to a tactical bar extending between two or more sections of a tie-down system. For example, top cap 200 may be secured to a tactical bar, such as tactical bar 712 of FIG. 7, which is shown in FIG. 7 as extending between two sections of E-Track 710A, 710B. One or more other structural features may be installed in the container 313 to secure top cap 200 and may include, but are not limited to, any one or more of rails, hooks, loops, eyebolts, anchors, tie-down pockets, and ratchets.

Figure 4A:
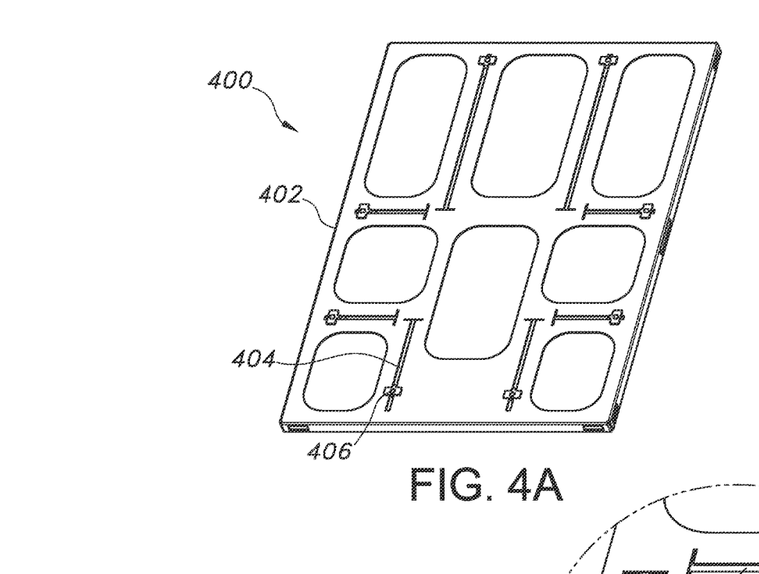
FIGS. 4A-4C are isometric views of a top cap in accordance with a fourth embodiment of this disclosure.
Figure 4B:
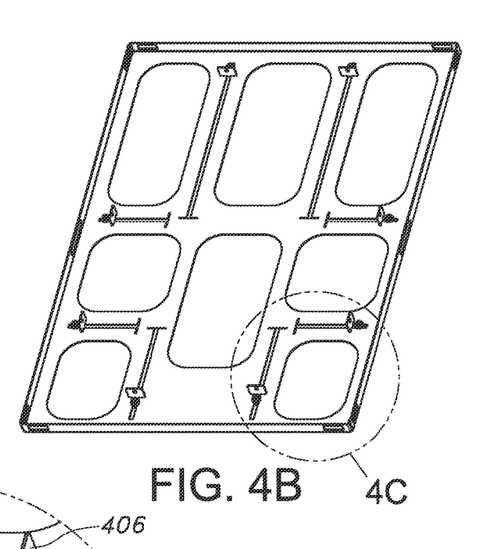
Figure 4C:
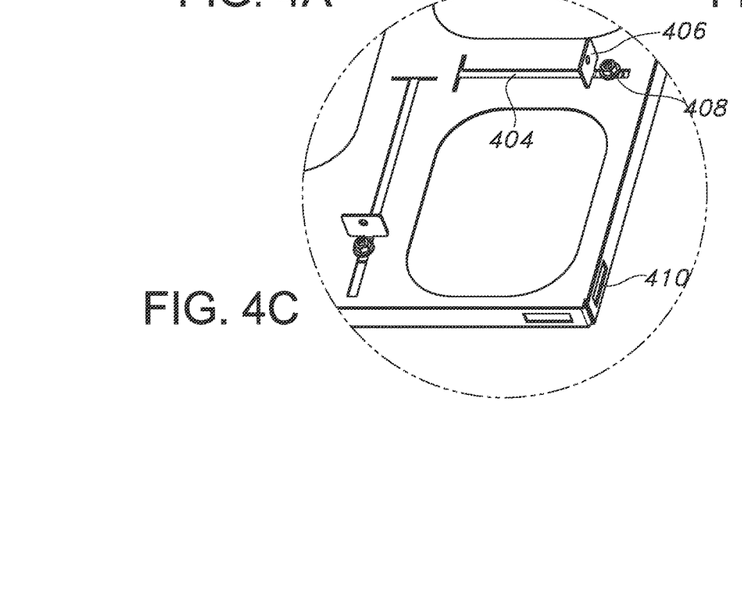

FIGS. 4A and 4B are top-down and bottom-up isometric views of a top cap 400, respectively. Top cap 400 comprises a body 402 formed of a suitable material, for example, a rigid material. The rack engagement features of top cap 400 are movable brackets 406 distributed around the body 402. The brackets 406 may be positioned to fit a desired rack 100 footprint and to engage a corresponding top of the rack 100. Brackets 406 are disposed in slots 404 distributed around the body 402. As show in view A, fasteners 408 retain brackets 406 within the slots 404 and permit the brackets 406 to be slid along and repositioned within the slots 404. To reduce the overall weight of top cap 400, body 402 includes one or more cutouts, such as cutout 408. Referring back to FIG. 4C, one or more constraints are secured to top cap 400 via securement slots 410 defined around the periphery of body 402. During use, the one or more constraints may be looped through, hooked to, clipped onto, or otherwise attached to securement slots 410 to attach top cap 400 to one or more structural features of a container, for example, container 313.

Figure 5:
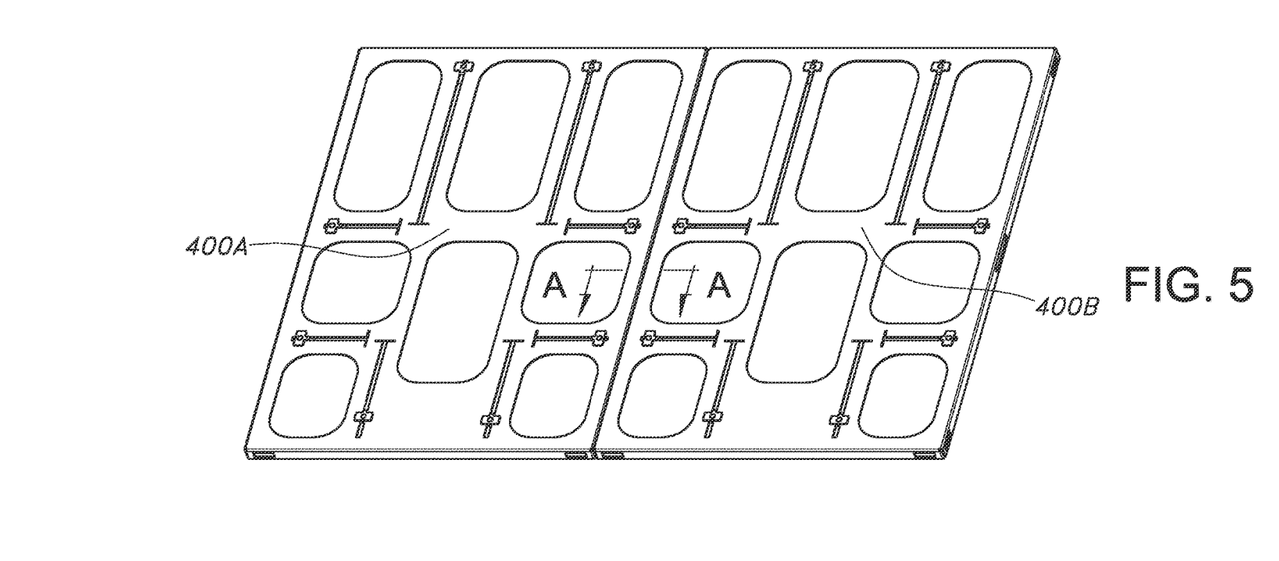
FIG. 5 is an isometric view of two top caps in accordance with the fourth embodiment.
Figure 5A:
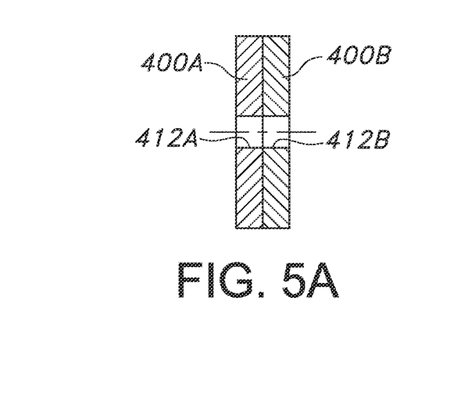
FIGS. 5A-5C are cross-sectional views depicting variation s of the top caps of FIG. 5.
Figure 5B:
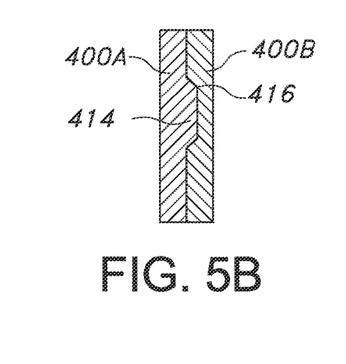
Figure 5C:
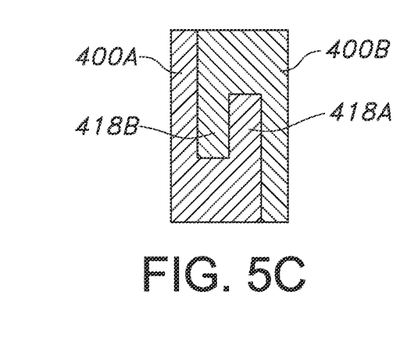

Top caps, such as top cap 200 and top cap 400, in accordance with this disclosure may also include direct engagement features for engaging other top caps or structural features of a container, such as container 313, without the use of constraints. For example, FIG. 5 depicts two top caps 400A, 400B that have been made to abut and engage each other. FIGS. 5A-C are examples of cross-section A-A and depict direct engagement features that may be used to engage top caps 400A, 400B, with each other. In FIG. 5A, top caps 400A and 400B include holes 412A, 412B such that when top caps 400A, 400B are aligned, a fastener, clip, rod, tie, or similar item may be inserted through the holes to secure top caps 400A, 400B together. In certain embodiments, top caps 400A, 400B may include features such that when top caps 400A, 400B are made to abut, the features engage with each other. For example, in FIG. 5B, the abutting faces of top caps 400A, 400B engage using a tongue-and-groove arrangement. Specifically, top cap 400A includes a tongue 414 running along at least a portion of its length that engages a groove 416 extending along a corresponding portion of the length of top cap 400B, FIG. 5C depicts another embodiment in which top caps 400A, 400B include mating splices 418A, 418B that interlock when top caps 400A, 400B abut. Other examples of suitable direct engagement features include interlocking fingers, clips, and dovetails.

Figure 6:
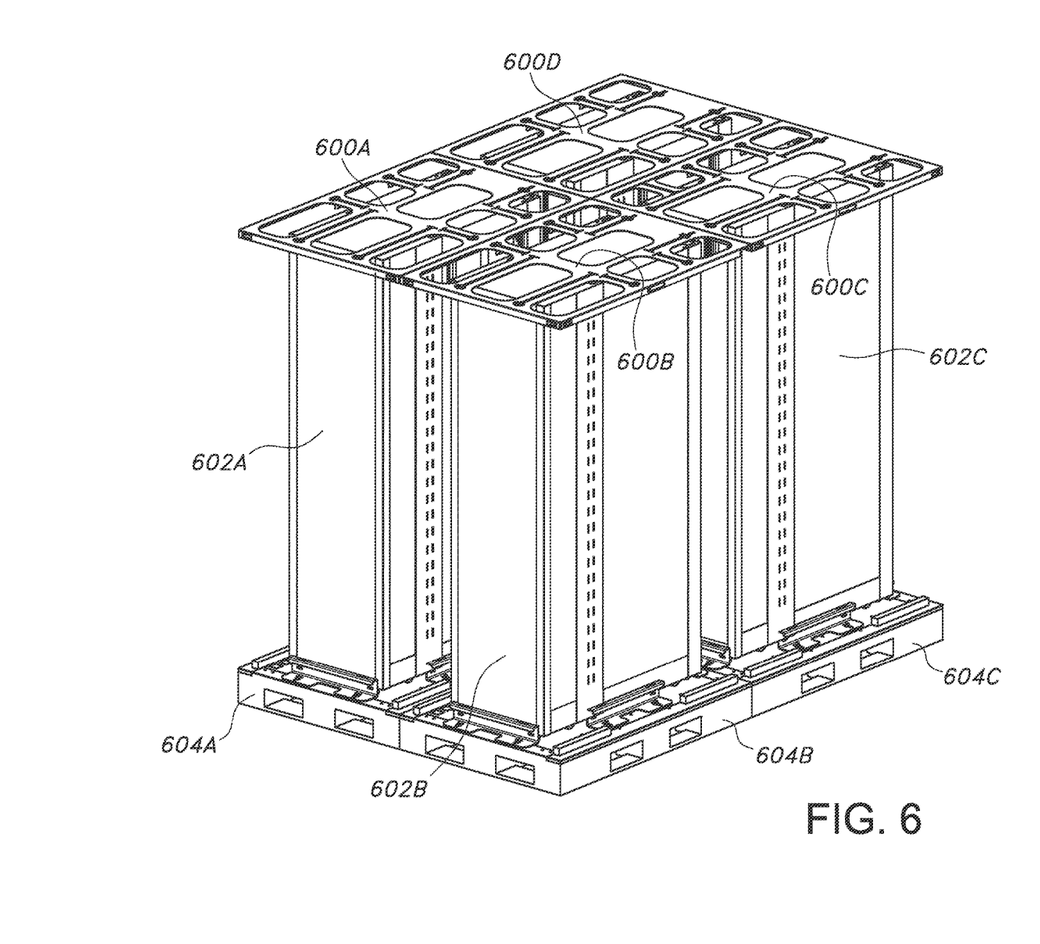
FIG. 6 is an isometric view of four computer racks in a close packed configuration and having top caps in accordance with this disclosure.

Including direct engagement features may permit close packing of racks during transportation. FIG. 6, for example, is an isometric view of four racks 602A-C (fourth rack is obscured) that are close packed for transportation. Each rack (generally referred to as 602) is mounted on a pallet 604A-C (fourth pallet is obscured). Placed atop each rack 602 and adjusted to fit each rack 602 is a top cap 600A-D in accordance with this disclosure. To facilitate close packing of the racks 502, each corresponding top cap 600A-D (generally referred to as 600) may occupy the same footprint as its corresponding pallet (generally referred to as 604). Moreover, abutting faces of the top caps 600A-D may engage each other via one or more direct engagement features, as previously discussed. When close packed in the manner depicted in FIG. 6 or in a similar manner in which top caps 600 directly engage each other, constraint securement features, such as eyebolts 209 depicted in FIG. 2A or securement slots 410 depicted in view A of FIG. 4B, along the non-abutting sides of the top caps 600 may still be accessible and may be used to secure the top caps 500 to structural features of a container, such as load bars 316A, 316B of container 313 as shown in FIG. 3.

In certain embodiments, the direct engagement features may be used to directly engage top caps to structural features of a container. For example, FIG. 7 is an isometric view of the interior of a container 713. Installed on the internal walls of container 713 are a pair of E-Tracks 710A, 710B. Mounted between E-Tracks 710A, 710B is a horizontally mounted tactical bar 712. The container 713 may contain one or more racks, such as racks 702A-B, and the one or more racks may be mounted on respective pallets, such as pallets 704A, 704B. Atop racks 702A-B are top caps 700A, 700B. Top caps 700A, 700B abut each other on one side and on another side of top caps 700A, 700B that is perpendicular to the abutting side, the top caps 700A, 700B abut tactical bar 712. As previously discussed in the context of FIG. 5, top caps 700A, 700B may include direct engagement features that permit any two or more top caps (generally referred to as 700) to engage with each other. Tactical bar 712 may also include direct engagement features, such as the holes 412A, 412B, tongues 414, grooves 416, and splices 418A, 418B depicted in FIG. 5, to directly engage top caps 700A, 700B. Constraints may then be used to connect constraint securement features along the non-engaging sides of top caps 700A, 700B to additional structural features, such as load bars 316A, 316B of FIG. 3, within the container.

Figure 8A:
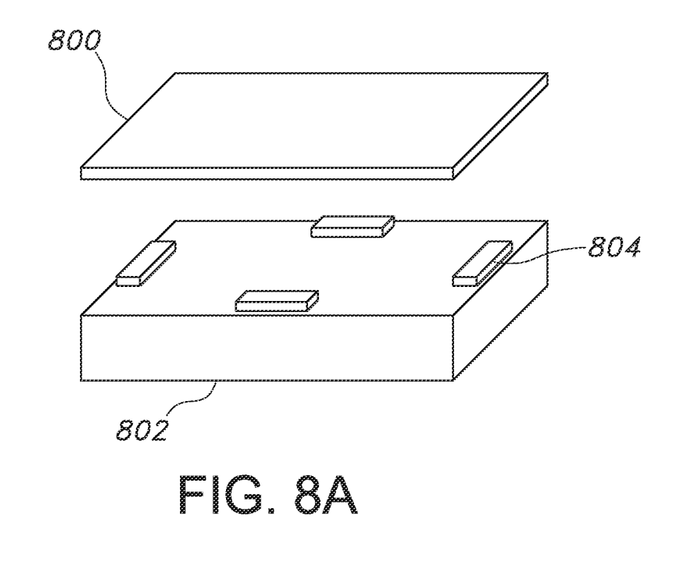
FIGS. 8A-8B are isometric views of stackable top caps and pallets.
Figure 8B:
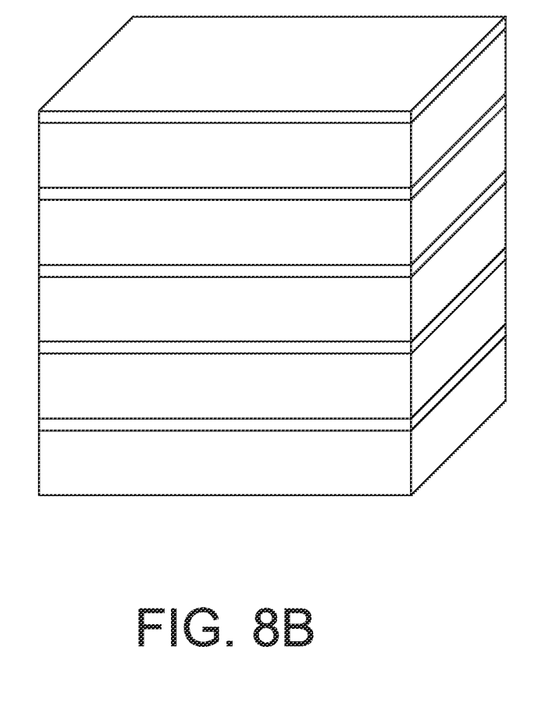
Figure 9A:
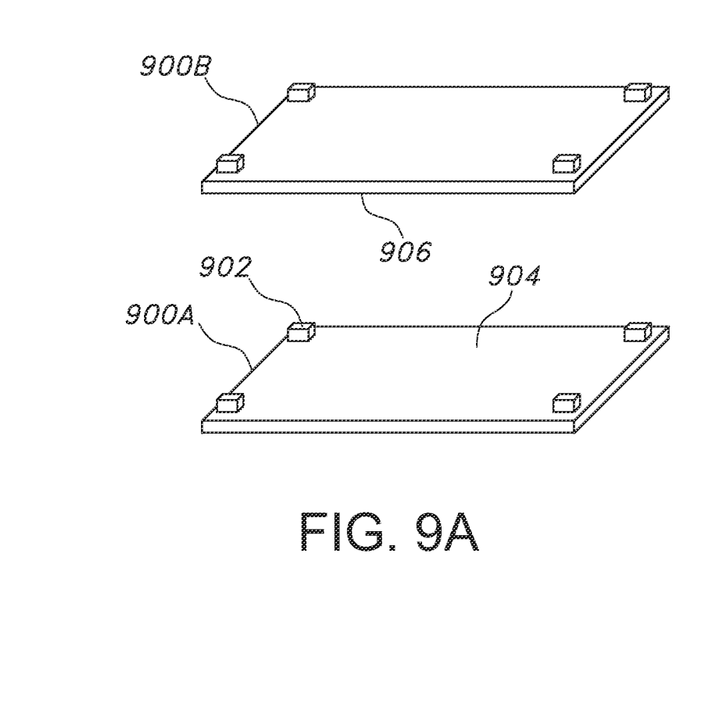
FIGS. 9A-9B are isometric views of stackable top caps.
Figure 9B:
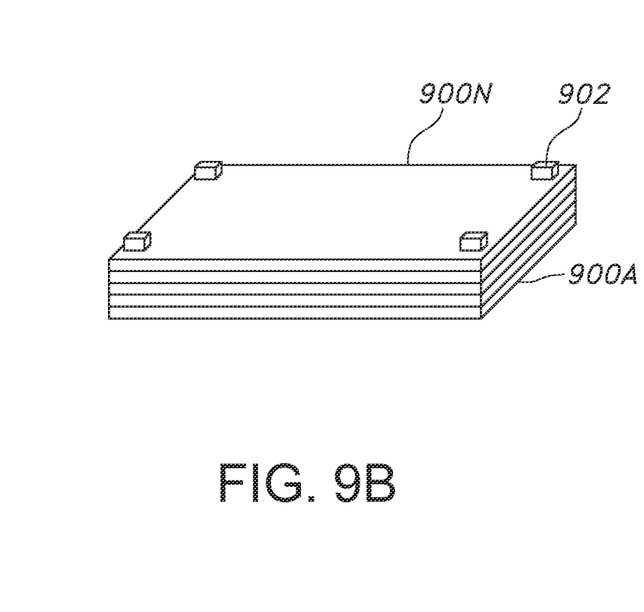

In certain embodiments, top caps in accordance with this disclosure may be designed to be reusable with racks of similar sizes or, if the mating features of the top caps are adjustable, to be reusable with racks of differing sizes. Accordingly, after top caps have been used to transport a rack to a destination, it may be necessary to transport the top caps back to their point of origin. To minimize the cargo space occupied by top caps, the top caps may be designed to be stackable with each other or with pallets. For example, FIG. 8A includes a pallet 802 and a top cap 800. Pallet 802 may include brackets 804 or similar features for receiving and securing top cap 800. Once secured, top cap 800 and pallet 802 may be stacked with other top caps and pallets as depicted in FIG. 7B. Alternatively, a top cap 800 may be configured to stack with other top caps 800 without a pallet 802. FIG. 9A, for example, depicts a top cap 900A having stacking features, specifically a plurality of protrusions 902 on an upper face 904 of the top cap 900A, which are sized and positioned to mate with an underside 906 of a second top cap 900B. Such mating permits stacking of a plurality of top caps, such as top caps 900A to 900N of FIG. 9B where 900N corresponds to any number of stacked top caps.

Figure 10:
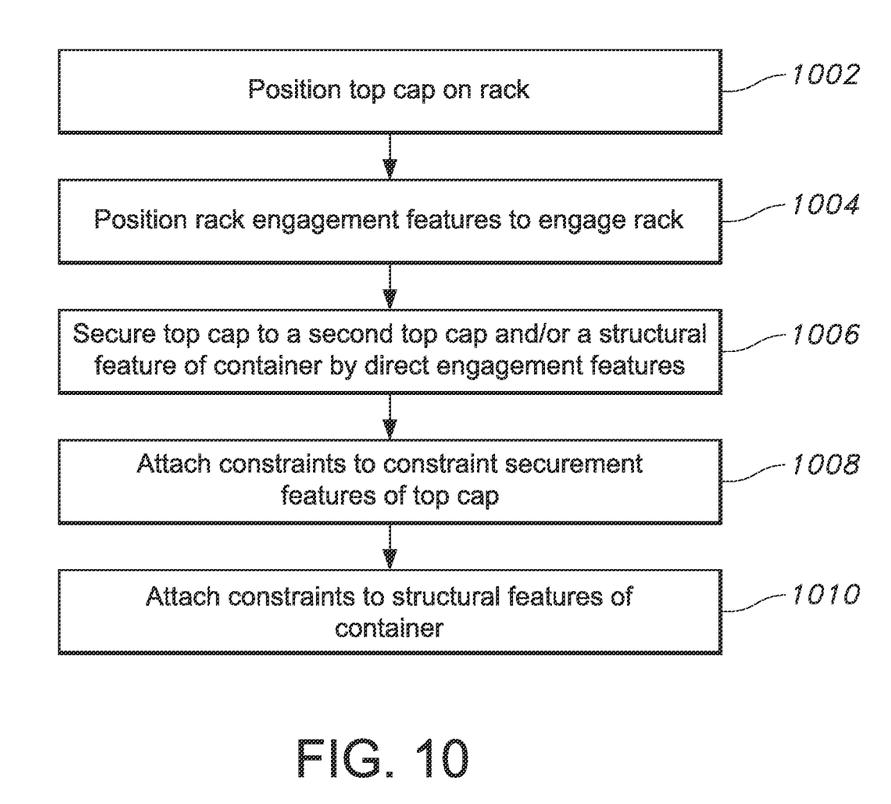
FIG. 10 is a flow chart describing use of top caps in accordance with an embodiment of this disclosure.

FIG. 10 is a flow chart describing a method for configuring one or more top caps 200 to secure a rack 312 for transportation. At step 1002, a top cap 200 is positioned on a rack 312. At step 1004, one or more rack engagement features, such as movable brackets 204, are positioned to fit the rack 312. In certain embodiments the rack engagement features, may be one or more of removable and adjustable. For example, the rack engagement features may be movable brackets 204. Accordingly, step 902 may comprise placing or adjusting movable brackets 204 to fit the rack 312. Rack engagement features may be positioned or adjusted to fit the rack 312 before, after, during, or any combination thereof placement of the top cap 200 on the rack 312.

At step 1006, top cap 200 is secured to one or more of a second top cap or a container 313 via direct engagement features. For example, as depicted in FIG. 5, a top cap 400A may be made to directly engage a second top cap 400B via direct engagement features which may include, but are not limited to, holes 412A, 412B for receiving ties, fasteners or similar items, a tongue 416 and corresponding groove 416 arrangement, and mating splices 418A, 418B. Alternatively or in addition to directly engaging top cap 200 with a second top cap, top cap 200 may be directly engaged to a structural feature of the container 313. As shown in FIG. 7, for example, top caps 700A, 700B are directly engaged to a tactical bar 712 extending between two sections of E-Track 710A, 710B.

At step 1008, one or more constraints are attached to one or more constraint securement features, such as eyebolt 209 and constraint securement slot 410, Depending on the specific type of constraint and constraint securement feature implemented, attaching the constraint to the constraint securement feature may comprise looping or passing the constraint through the constraint securement feature, clipping the constraint to the constraint securement feature, or tying the constraint to the constraint securement feature, At step 1010, top cap 200 is secured by attaching the one or more constraints to to one or more structural features of container 313. For example, top cap 200 may be secured to one or more of load bars 316A, 316B as depicted in FIG. 3, a tactical bar 712 as depicted in FIG. 7, a tie down system such as E-Track or L-Track, rails, hooks, eyebolts, anchors, and tie down pockets.

In one or more embodiments, any one or more of the steps depicted generally at 900 may not be performed. In other embodiments, any one or more of the steps depicted at 900 may be performed in any suitable order or in any combination.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A device for securing an item for transportation, comprising:
   a body;
   one or more engagement features,
      wherein the one or more engagement features are movable between two or more positions along the body, and
      wherein the one or more engagement features engage one or more structural elements of the item to fit the device to a top of the item;
   one or more direct engagement features, wherein the one or more direct engagement features engage one or more other devices; and
   one or more constraint securement features distributed around the body, wherein the one or more constraint securement features are shaped to receive one or more constraints to secure the device to a first structural feature of a container.

2. The device of claim 1, wherein the body further comprises:
   one or more integral protrusions; and
   one or more recesses;
   wherein each of the one or more integral protrusions and the one or more recesses engage the item when the device is placed atop the item.

3. The device of claim 1, wherein the body comprises one or more slots that mate with the one or more engagement features and wherein the two or more positions correspond to different positions of the one or more engagement features within the one or more slots.

4. The device of claim 1, wherein the body defines one or more holes for receiving the one or more engagement features and wherein the two or more positions correspond to different holes of the one or more holes for receiving the one or more engagement features.

5. The device of claim 1, wherein the body further comprises:
   one or more first mating features disposed around the body for attaching the device to at least one of a second structural feature of the container and a second mating feature disposed on a second body of a second device.

6. The device of claim 1, wherein the body further comprises an upper face having a plurality of protrusions sized and positioned to mate with an underside of a second device.

7. The device of claim 1, wherein the first structural feature of the container comprises at least one of a tie-down system, a rail, a hook, a loop, an eyebolt, an anchor, a tie-down pocket, and a ratchet.

8. The device of claim 1, wherein at least one of the one or more constraints comprise at least one of a strap, a rope, a cable, a cord, a chain, netting, and a solid bar.

9. A top cap for securing an item to be transported, comprising:
   a body defining a plurality of slots;
   a bracket disposed in at least one of the plurality of slots, wherein the bracket is selectively positionable along the at least one of the plurality of slots to engage an engagement feature of the item to fit the top cap to a top of the item;
   one or more direct engagement features disposed about the top cap, wherein the one or more direct engagement features engage one or more other top caps; and
   one or more constraint securement features disposed around the body shaped to receive one or more constraints to secure the top cap to a first structural feature of a container.

10. The top cap of claim 9, wherein the top cap further comprises:
    one or more mating features engaged to at least one of a second structural feature of the container and a first mating feature of a second top cap.

11. The top cap of claim 9, wherein the one or more constraint securement features comprise at least one of an eyebolt, a securement slot defined by the body, a clip, a hoop, a tie-down anchor, and a pulley.

12. The top cap of claim 9, wherein the first structural feature of the container is one of a tie-down system, a rail, a hook, a loop, an eyebolt, an anchor, a tie-down pocket, and a ratchet.

13. The top cap of claim 9, wherein at least one of the one or more constraints comprise at least one of a strap, a rope, a cable, a cord, a chain, netting, and a solid bar.

14. The top cap of claim 9, wherein the body further comprises an upper face having a plurality of protrusions mated with an underside of a second top cap.

15. A method of securing an item to be transported comprising:
    placing a top cap having a body, one or more engagement features and one or more constraint securement features on the item, wherein the one or more constraint securement features are distributed around the body;
    moving the one or more engagement features along the body from a first position on the body to at least a second position on the body;
    engaging the one or more engagement features of the top cap with one or more structural elements of the item to fit the top cap to a top of the item;
    engaging one or more direct engagement features of the top cap with one or more other top caps;
    receiving, by the one or more constraint securement features, one or more constraints to secure the item to a first structural feature of a container; and
    securing the top cap to the first structural feature via at least one of the one or more constraints.

16. The method of claim 15, wherein at least one of the one or more engagement features of the top cap comprises a bracket, wherein the body is defined by one or more slots, wherein engaging the one or more engagement features of the top cap with one or more structural elements of the item further comprises:
adjusting a position of the bracket along at least one of the one or more slots.

17. The method of claim 15, wherein the first structural feature of the container comprises at least one of a tie-down system, a rail, a hook, a loop, an eyebolt, an anchor, a tie-down pocket, and a ratchet.

18. The method of claim 15, wherein the one or more constraints comprise at least one of a strap, a rope, a cable, a cord, a chain, netting, and a solid bar.

19. The method of claim 15, further comprising:
engaging a mating feature of the top cap with one of a second structural feature of the container and a second mating feature of a second top cap.

20. The method of claim 15, further comprising:
removing the top cap from the item;
adjusting a position of the one or more engagement features to accommodate a second item;
engaging the one or more engagement features with a structural element of the second item;
attaching the one or more constraints to the one or more constraint securement features of the top cap; and
securing the top cap to one or more second structural features of the container via the one or more constraints.

* * * * *